(12) United States Patent
Brück et al.

(10) Patent No.: US 7,318,276 B2
(45) Date of Patent: Jan. 15, 2008

(54) PROCESS AND APPARATUS FOR PRODUCING HONEYCOMB BODIES AND HONEYCOMB BODY PRODUCED BY THE PROCESS

(75) Inventors: Rolf Brück, Bergisch Gladbach (DE); Arndt-Udo Rolle, Siegburg (DE)

(73) Assignee: Emitec Gesellschaft Fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/063,213

(22) Filed: Feb. 22, 2005

(65) Prior Publication Data

US 2005/0191220 A1    Sep. 1, 2005

Related U.S. Application Data

(63) Continuation of application No. PCT/EP03/09266, filed on Aug. 21, 2003.

(30) Foreign Application Priority Data

Aug. 21, 2002   (DE)   ................. 102 39 205

(51) Int. Cl.
B21D 53/00    (2006.01)
B23P 15/26    (2006.01)
(52) U.S. Cl. .................. 29/890.039; 29/890; 228/173; 228/182; 428/116; 422/177; 422/180; 422/222
(58) Field of Classification Search ............... 422/180, 422/177, 222; 428/116; 228/173, 182; 29/890, 890.039
See application file for complete search history.

(56) References Cited

U.S. PATENT DOCUMENTS

| 4,241,146 A | * | 12/1980 | Sivachenko et al. | ........ 428/600 |
|---|---|---|---|---|
| 4,273,681 A | | 6/1981 | Nonnenmann | |
| 4,381,590 A | | 5/1983 | Nonnenmann et al. | |
| 4,521,947 A | | 6/1985 | Nonnenmann et al. | |
| 4,602,001 A | * | 7/1986 | Cyron | ........................ 502/439 |
| 4,803,189 A | | 2/1989 | Swars | |
| 4,832,998 A | * | 5/1989 | Cyron | ........................ 428/116 |
| 4,923,109 A | | 5/1990 | Cyron | |
| 4,946,822 A | | 8/1990 | Swars | |
| 5,105,539 A | * | 4/1992 | Maus et al. | ................... 29/890 |

(Continued)

FOREIGN PATENT DOCUMENTS

DE    29 02 779 A1    7/1980

(Continued)

*Primary Examiner*—N. Bhat
(74) *Attorney, Agent, or Firm*—Laurence A. Greenberg; Werner H. Stemer; Ralph E. Locher

(57) ABSTRACT

A process and an apparatus for producing a honeycomb body include forming a metallic honeycomb structure having cavities through which a fluid can at least partially flow, and bringing at least one end side of the honeycomb structure into contact with a metallic melt having a lower melting point than the metallic honeycomb structure. The process and the apparatus allow layers of sheet metal to be intimately and permanently joined in an advantageous manner in joining regions by placing at least one end face of a honeycomb structure of the honeycomb body in contact with a metallic melt which has a lower melting point than the honeycomb structure and contains aluminum, for example. A honeycomb body which is produced by the method or the apparatus is also provided.

17 Claims, 2 Drawing Sheets

U.S. PATENT DOCUMENTS

| | | | |
|---|---|---|---|
| 5,135,794 A | | 8/1992 | Maus et al. |
| 5,157,010 A | * | 10/1992 | Maus et al. ............... 502/439 |
| 5,240,682 A | * | 8/1993 | Cornelison et al. ......... 422/174 |
| 5,431,330 A | | 7/1995 | Wieres |
| 5,501,391 A | | 3/1996 | Wieres |
| 5,944,250 A | | 8/1999 | Zagalskiy |
| 5,966,228 A | * | 10/1999 | Akiba et al. ............... 398/147 |
| 6,036,926 A | * | 3/2000 | Wieres ...................... 422/180 |
| 6,057,263 A | * | 5/2000 | Takahashi et al. ......... 502/439 |
| 6,143,099 A | * | 11/2000 | Maus et al. ................ 148/530 |
| 6,190,784 B1 | | 2/2001 | Maus et al. |
| 6,425,517 B1 | | 7/2002 | Wieres et al. |
| 6,497,039 B1 | | 12/2002 | Wieres et al. |
| 6,634,542 B1 | | 12/2002 | Wieres |
| 6,740,178 B2 | * | 5/2004 | Kurth et al. ............... 148/529 |
| 2001/0013390 A1 | | 8/2001 | Staubwasser |
| 2002/0129890 A1 | | 9/2002 | Staubwasser |

FOREIGN PATENT DOCUMENTS

| | | |
|---|---|---|
| DE | 29 24 592 A1 | 1/1981 |
| DE | 198 23 000 A1 | 11/1999 |
| EP | 0 159 468 A2 | 10/1985 |
| EP | 0 245 737 B1 | 11/1987 |
| WO | 89/11938 | 12/1989 |
| WO | 90/03220 | 4/1990 |
| WO | 93/25339 | 12/1993 |
| WO | 94/06594 | 3/1994 |
| WO | 97/49905 | 12/1997 |

* cited by examiner

PROCESS AND APPARATUS FOR PRODUCING HONEYCOMB BODIES AND HONEYCOMB BODY PRODUCED BY THE PROCESS

CROSS-REFERENCE TO RELATED APPLICATIONS

This is a continuing application, under 35 U.S.C. § 120, of copending International Application No. PCT/EP2003/009266, filed Aug. 21, 2003, which designated the United States; this application also claims the priority, under 35 U.S.C. § 119, of German Patent Application 102 39 205.6, filed Aug. 21, 2002; the prior applications are herewith incorporated by reference in their entirety.

BACKGROUND OF THE INVENTION

1. Field of the Invention

The present invention relates to a process and an apparatus for producing a metallic honeycomb body, in particular a honeycomb body for an exhaust system of an internal combustion engine. The invention also relates to a honeycomb body produced by the process or the apparatus. Such honeycomb bodies are used as carriers for catalytically active material and/or for adsorber material, as well as similar applications.

A distinction is drawn in particular between two typical forms of metallic honeycomb bodies. An early form, of which German Published, Non-Prosecuted Patent Application DE 29 02 779 A1, corresponding to U.S. Pat. No. 4,273,681, shows typical examples, is the helical form, in which, substantially, a smooth sheet-metal layer and a corrugated sheet-metal layer are placed on top of one another and wound helically. In another form, the honeycomb body is constructed from a multiplicity of alternately disposed smooth and corrugated or differently corrugated sheet-metal layers, with the sheet-metal layers initially forming one or more stacks, which are then intertwined. In the process, the ends of all of the sheet-metal layers come to lie on the outer side and can be joined to a housing or tubular casing, thereby forming numerous connections, which increase the durability of the honeycomb body. Typical examples of those forms are described in European Patent EP 0 245 737 B1, corresponding to U.S. Pat. Nos. 4,803,189; 4,832,998; 4,923,109; and 4,946,822 or International Publication No. WO 90/03220, corresponding to U.S. Pat. Nos. 5,105,539 and 5,135,794. Finally, there are also honeycomb bodies with a conical structure which, if appropriate, also have further additional structures for influencing flow. A honeycomb body of that type is described, for example, in International Publication No. WO 97/49905, corresponding to U.S. Pat. No. 6,190,784.

When producing catalyst carrier bodies, in particular for use in the treatment of exhaust gases from internal combustion engines, in particular from motor vehicles, it is necessary, due to the durability and load-bearing capacity which needs to be achieved, to join the various sheet-metal layers to one another and to the tubular casing as securely as possible. In the present text and in the text which follows below, the term sheet-metal layers is to be understood on one hand as meaning metallic sheet layers, but on the other hand also layers of a material through which a fluid at least partially flows. Materials of that nature through which a fluid at least partially flows are used to construct open particulate filters.

A brazing technique, in which the sheet-metal layers are preferably joined by a brazing process, is often used to join two sheet-metal layers. Various techniques, which preferably use brazing powder or brazing strips, but also brazing paste, are known for application of the brazing material. Processes for applying a bonding agent and brazing material to a metallic configuration which includes a honeycomb body are known, for example, from International Publication No. WO 89/11938, corresponding to U.S. Patent Application Publication Nos. U.S. 2001/0013390 A1 and U.S. 2002/0129890 A1, International Publication No. WO 94/06594, corresponding to U.S. Pat. No. 5,501,391, International Publication No. WO 93/25339, corresponding to U.S. Pat. No. 5,431,330, German Published, Non-Prosecuted Patent Application DE 29 24 592 A1, corresponding to U.S. Pat. Nos. 4,381,590 and 4,521,947, and German Published, Non-Prosecuted Patent Application DE 198 23 000 A1, corresponding to U.S. Pat. Nos. 6,425,517; 6,497,039; and 6,634,542.

Alternatively, it is known, for example, from European Patent EP 0 159 468 B1, corresponding to U.S. Pat. No. 4,602,001, to apply an additive, which substantially includes aluminum, in powder form using binder, adhesive or the like to join the sheet-metal layers to one another. The joint between the sheet-metal layers is produced by the formation of an alloy in the joining regions of the sheet-metal layers.

However, the step of applying a bonding agent and then applying the pulverulent additive or brazing material generally proves relatively complicated, in particular in terms of handling. Moreover, in particular brazed joints have drawbacks in terms of durability.

SUMMARY OF THE INVENTION

It is accordingly an object of the invention to provide a process and an apparatus for producing honeycomb bodies and a honeycomb body produced by the process or the apparatus, which overcome the herein afore-mentioned disadvantages of the heretofore-known processes, apparatuses and products of this general type and which allow sheet-metal layers to be joined with good durability while using a simple procedure.

With the foregoing and other objects in view there is provided, in accordance with the invention, a process for producing a honeycomb body. The process comprises a) forming a metallic honeycomb structure having cavities through which a fluid can at least partially flow, and b) bringing at least one end side of the honeycomb structure into contact with a metallic melt having a lower melting point than the metallic honeycomb structure.

The process according to the invention advantageously allows the metallic melt to be used to form joints between the individual sheet-metal layers through the use of at least one end side being brought into contact with it as described above. Bringing the end side into contact with the metallic melt causes the metallic melt to penetrate into the cavities of the honeycomb structure due to capillary action, with the melt wetting the walls of the cavities of the honeycomb structure.

The walls of the cavities or channels of a metallic honeycomb structure are preferably formed from steel. Depending on the temperature of the honeycomb structure and of the metallic melt, metals contained in the melt, for example aluminum, diffuse into the steel of the walls of the honeycomb structure. As a result, in this example, an aluminum-steel alloy with a locally increased aluminum content is formed. The melting point of an alloy of this type decreases as the aluminum content rises. If the walls of the honeycomb structure are formed by sheet-metal layers, a joint is formed between adjacent sheet-metal layers. The ongoing diffusion of the aluminum causes the local aluminum content to drop again, the melting point to rise and the joint to harden as a result.

In accordance with another mode of the invention, the honeycomb structure is formed by winding at least one sheet-metal layer, at least one of which is at least partially structured. In this way it is possible, for example, to produce a helical honeycomb structure. This can be formed by winding a single structured sheet-metal layer, but can equally well be produced by using one structured and one substantially smooth sheet-metal layer. According to the invention, it is equally possible to form a helical honeycomb structure by winding an at least partially structured sheet-metal layer. The structuring, which is preferably in the form of a corrugation, of individual sheet-metal layers or part of the sheet-metal layers, makes it possible in a simple way to form cavities through which a fluid can at least partially flow, for example an exhaust gas from an internal combustion engine.

If metal or metals, for example aluminum, contained in the melt, penetrate into a sheet-metal layer, a locally increased concentration of this metal is formed there, and if there is a region of contact between two sheet-metal layers or of a sheet-metal layer with itself, it leads to these two regions being joined. It is important in this context that the alloy of the steel with the melt have a melting point which drops as the content of the metal rises. This is the case, for example, with aluminum. It is then possible to work at a temperature which is below the melting point of the base material from which the passage walls are formed but above the melting point of the alloy with a locally increased content of the metal. Therefore, in the case of an aluminum-containing metallic melt, the alloy with a locally increased aluminum content is partially melted, and if there is a region of contact between two sheet-metal regions this leads to the sheet-metal layers being fused together.

In accordance with a further mode of the invention, the honeycomb structure is formed by stacking a plurality of sheet-metal layers, some of which are structured and some of which are substantially smooth, and intertwining one or more stacks. In this case too, joints are advantageously formed between two sheet-metal layers through the formation of an alloy with a locally increased aluminum content.

In accordance with an added mode of the invention, at least some of the sheet-metal layers at least partially include material through which a fluid can at least partially flow. This advantageously allows the formation of honeycomb structures which act as what are known as open particulate filters.

A particulate filter is described as open if particulates can in principle pass completely through it, specifically including particulates which are considerably larger than the particulates that are actually to be filtered out. Consequently, a filter of this type cannot become blocked during operation even in the event of particulates agglomerating. A suitable method for measuring the openness of a particulate filter is, for example, to test the diameter up to which spherical particulates can still trickle through a filter of this type. In existing applications, a filter is open in particular if spheres with a diameter of greater than or equal to 0.1 mm can still trickle through it, preferably spheres with a diameter of over 0.2 mm.

In accordance with an additional mode of the invention, the honeycomb structure is introduced into a tubular casing before or after method step b). In this case, a joint can also be formed between the tubular casing and the honeycomb structure in a similar manner to the joint between the individual sheet-metal layers, by using the diffusion of the metal, for example aluminum, contained in the metallic melt, into the honeycomb structure and the tubular casing.

In accordance with yet another mode of the invention, a thermal joint, preferably a brazed or welded joint, particularly preferably an induction-brazed joint, is formed after process step b) in order to connect the honeycomb structure and tubular casing. The formation of a thermal joint between the tubular casing and the honeycomb structure makes it possible to form a permanent connection between the tubular casing and the honeycomb structure.

In accordance with yet a further mode of the invention, a thermal joint, preferably a brazed or welded joint, particularly preferably an induction-brazed joint, is formed before process step b), preferably just before process step b), in order to connect the honeycomb structure and the tubular casing. Since the tubular casing and/or the honeycomb structure are heated during the formation of a thermal joint, the heat which is introduced into the honeycomb structure and/or the tubular casing can advantageously be used to influence the flow properties of the metallic melt within the honeycomb structure. In particular, the formation of a joint just before process step b), i.e. the step of bringing the honeycomb structure into contact with the metallic melt, advantageously makes it possible to utilize the heat which has been introduced by the formation of the thermal joint. This is advantageous with a view toward using energy as efficiently as possible.

In accordance with yet an added mode of the invention, the honeycomb structure and/or the tubular casing are heated to a predetermined temperature, which substantially corresponds to that of the metallic melt, prior to process step b). As an alternative, it is also possible for the honeycomb structure and/or the tubular casing to be heated to a predetermined temperature, which is above or below the temperature of the metallic melt, prior to process step b).

The heating of the honeycomb structure and/or of the tubular casing advantageously allows the procedure to be influenced. In particular, by stipulating the temperature of the metallic melt, on one hand, and the temperature of the honeycomb structure and/or the tubular casing, on the other hand, it is possible to control the depth of penetration of the metallic melt into the honeycomb structure, i.e. the height to which it rises under capillary action, and also to control the diffusion length into the passage walls and therefore the properties of the joints which are formed. In this context, it is particularly advantageous to match the depth of penetration and the diffusion length to the subsequent demands imposed on the honeycomb body. A further possible way of influencing the procedure relates to the composition of the melt. By way of example, it may contain constituents which influence parameters such as surface tension and/or viscosity of the additive.

In accordance with yet an additional mode of the invention, the metallic melt is at a predetermined temperature which substantially corresponds to the melting point of the metallic melt. This is particularly advantageous since it allows the energy demand required to maintain the operating temperature of the metallic melt to be kept at a low level.

In accordance with again another mode of the invention, at least the step of bringing the honeycomb structure and if appropriate the tubular casing into contact with the metallic melt is carried out under vacuum or shielding gas, preferably under shielding gas. Working under a vacuum or shielding gas makes it possible to avoid oxidation of parts of the metallic melt with atmospheric oxygen, which can lead to the formation of lumps in the melt. If a shielding gas atmosphere is used, on one hand it is possible to work in a closed chamber, which has a type of lock for access to the components, i.e. for example honeycomb structures and tubular casings, making it possible to carry out the operation substantially without air penetrating into the chamber. On the other hand, it is also possible to make the locks simpler and to keep the chamber under a slight superatmospheric pressure of shielding gas, in order to thereby prevent the penetration of air.

In accordance with again a further mode of the invention, the metallic melt at least contains aluminum. In this context, it is preferable for the metallic melt to substantially include aluminum. Substantially pure aluminum has a lower melting point than the steel which forms the honeycomb structure. This readily allows a composition of the metallic melt which leads to the formation of durable joints between the steel sheets.

In accordance with again an added mode of the invention, the metallic melt represents an aluminum-based alloy. This makes it possible to provide the melt in a simple way. The procedure can then be controlled by controlling the temperature of the honeycomb structure and/or of the tubular casing and by controlling the temperature of the melt.

With the objects of the invention in view, there is also provided an apparatus for producing a metallic honeycomb body. The apparatus comprises a reservoir for holding a metallic melt having a lower melting point than a melting point of the metal of the metallic honeycomb body. The reservoir has an opening. At least one first heating device is in thermal contact with the reservoir. A handling device has a) a gripper for gripping the honeycomb body, and b) a mover for moving the gripper at least to a position above the opening of the reservoir, preferably into the reservoir.

The apparatus according to the invention advantageously allows sheet-metal layers which form the metallic honeycomb structure to be joined to one another and if appropriate also allows the honeycomb structure to be joined to a tubular casing. The structure of the apparatus having a handling device which includes a gripper and a mover allows the honeycomb structure to be handled in a simple way. It is gripped using the gripper, and then the mover moves the gripper together with the honeycomb structure. The mover is constructed in such a way that it can move the gripper and therefore also the honeycomb structure at least to above the opening of the reservoir, and preferably also into the reservoir. Therefore, by moving the handling device it is possible to bring at least one end side of the honeycomb structure into contact with the metallic melt.

The first heating device may, for example, be constructed as an electrical heating device which is integrated in the reservoir, but any other heating device is also possible and in accordance with the invention, for example using a burner or through the use of waste heat from other processes. The first heating device causes the metallic melt to remain stable in the liquid state.

Bringing at least one end side of the honeycomb body into contact with the metallic melt leads to wetting of the surfaces of the honeycomb body through capillary action and, as explained above, to a joint being formed between the sheet-metal layers from which the honeycomb body is constructed.

In accordance with another feature of the invention, the device for forming a honeycomb structure has a device for stacking and intertwining or for winding one or more at least partially structured sheet-metal layers. By way of example, it is possible to produce a helical honeycomb structure. This structure can be formed by winding a single at least partially structured sheet-metal layer, but it is equally possible to wind one at least partially structured sheet-metal layer with one substantially smooth sheet-metal layer. It is equally possible and in accordance with the invention to form a helical honeycomb structure by winding an at least partially structured sheet-metal layer. Furthermore, according to the invention it is possible to produce one or more stacks of sheet-metal layers and to intertwine or wind them so as to produce a honeycomb structure. In this case, it is particularly advantageous to stack substantially smooth and structured sheet-metal layers alternately. The structuring, which preferably constitutes a corrugation, of individual sheet-metal layers or parts of sheet-metal layers, makes it possible, in a simple way, to form cavities or channels through which a fluid can at least partially flow, for example an exhaust gas from an internal combustion engine. Furthermore, it is possible for the sheet-metal layers at least in part to be provided with holes, the dimensions of which are in particular also larger than the structure repeat length of the structures of the at least partially structured sheet-metal layers.

In accordance with a further feature of the invention, at least one second heating device is provided, which is used to heat the honeycomb structure before it is brought into contact with the metallic melt. Heating of the honeycomb structure advantageously prevents the melt from freezing too quickly when it wets the walls of the cavities of the honeycomb structure. The second heating device may be constructed as an electric heating device, but it is equally possible to use a burner and/or the waste heat from other processes.

In accordance with an added feature of the invention, there is provided a device for introducing the honeycomb structure into a tubular casing. This device can be used, for example, to slide the honeycomb structure into the tubular casing.

In accordance with an additional feature of the invention, there is provided at least one induction-brazing device. This induction-brazing device may particularly advantageously be used to form a joint between the honeycomb structure and the tubular casing. The heat which is produced through induction brazing heats the honeycomb structure and the tubular casing, so that the honeycomb structure and the tubular casing are already advantageously heated. It is advantageously possible to configure the induction-brazing device in such a way that it can move freely. Furthermore, however, it is also possible for the induction-brazing device to be integrated in the reservoir wall or connected to the reservoir.

In accordance with again another feature of the invention, there is provided a control device connected to the first and/or second heating device over signal lines. This control device controls the temperature of the metallic melt and/or the reservoir and/or the honeycomb structure and/or the tubular casing. This advantageously allows the temperatures which are to be controlled to be kept constant within a predetermined range. In this context, it is also possible to provide feedback to the honeycomb structure and/or the tubular casing and/or the metallic melt. This can be realized by providing corresponding temperature sensors, for example using a contactless temperature-measuring technique, and connecting them to the control unit. The control unit may be an electronic device, but other control circuits are also possible.

In accordance with again a further feature of the invention, at least the reservoir is disposed in a chamber, preferably a vacuum chamber or shielding gas chamber. If the surface of the metallic melt in the reservoir is held under shielding gas or a vacuum, the formation of lumps in the metallic melt as a result of oxidation by atmospheric oxygen is advantageously avoided.

All of the other advantages which have been mentioned above in connection with the process according to the invention can be transferred accordingly to the apparatus according to the invention, and vice versa.

With the objects of the invention in view, there is additionally provided a honeycomb body produced by the process or by the apparatus.

Other features which are considered as characteristic for the invention are set forth in the appended claims.

Although the invention is illustrated and described herein as embodied in a process and an apparatus for producing honeycomb bodies and a honeycomb body produced by the process or the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
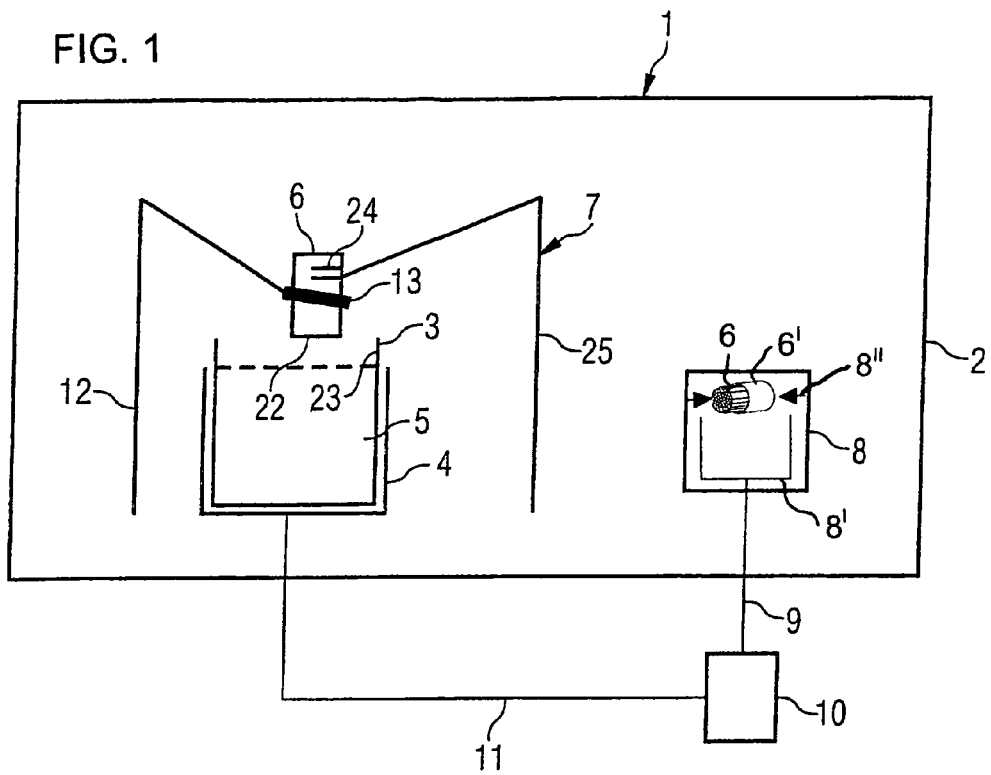
FIG. 1 is a diagrammatic and schematic view of an apparatus according to the invention for producing honeycomb bodies.

Referring now to the figures of the drawings in detail and first, particularly, to FIG. 1 thereof, there is seen a diagrammatic and schematic illustration of an apparatus 1 according to the invention for producing honeycomb bodies. The apparatus 1 includes a chamber 2, which can be evacuated or filled with shielding gas, i.e. inert gases. The chamber 2 is provided with non-illustrated locks, which allow access to the chamber 2 with relatively little loss of vacuum or shielding gas. A reservoir 3, which is in thermal contact with a first heating device 4, is formed in the chamber 2. The reservoir 3 has an opening 23. This first heating device 4 controls the temperature of a metallic melt 5 which is located in the reservoir 4. The metallic melt 5 has a melting point which is below the melting point of sheet-metal layers 14, 15 (shown in FIGS. 2 and 3) which form a honeycomb structure 6. In the present example, the metallic melt 5 contains at least some aluminum, i.e. is either pure aluminum or forms an aluminum alloy, preferably an aluminum-based alloy. It is advantageous if the metallic melt 5 substantially contains aluminum, but it is equally possible for the metallic melt 5 to be provided with other components which alter the physical properties of the metallic melt 5, for example its viscosity or surface tension.

Furthermore, the apparatus 1 has a first handling device 7 with a gripper 24 and a mover 25. The gripper 24 grips the metallic honeycomb structure 6. The gripper 24 and therefore also the honeycomb structure 6 are moved by the mover 25.

This honeycomb structure 6 is formed in a device 8, which is only diagrammatically indicated, for forming a honeycomb structure. In the process, sheet-metal layers, if appropriate substantially smooth and structured sheet-metal layers, are shaped into a honeycomb structure 6 by stacking and intertwining or also by winding. Furthermore, the device 8 for forming a honeycomb structure may include both a device 8" for introducing the honeycomb structure 6 into a tubular casing 6', such as by applying pressure along the arrows, and a second heating device 8', which heats the honeycomb structure 6 and/or the tubular casing 6' to a predetermined temperature. This second heating device 8' is connected over a first signal line 9 to a control device 10, which controls the temperature of the second heating device 8' or the honeycomb structure 6 to a predetermined value. The first signal line 9 is used both to transmit control signals to the second heating device 8' and signals from a non-illustrated temperature sensor in the second heating device 8'. The temperature sensor measures the temperature of the honeycomb structure. It is advantageously possible to use a temperature sensor which operates without contact in this case.

The control device 10 is connected to the first heating device 4 over a second signal line 11 and controls the temperature of the first heating device 4 or of the liquid melt or additive 5 to a predetermined value. In this case too, the second signal line 11 is used both to transmit control data to the first heating device 4 and to transmit temperature data from the first heating device 4 which is measured, for example, by a temperature sensor integrated in the first heating device 4.

The honeycomb structure 6 which has been formed is fixed by the gripper 24, so as to ensure that the diameter of the honeycomb structure 6 cannot change. The first handling device 7 moves the honeycomb structure 6 from the device 8 for forming a honeycomb structure 6 to the reservoir 3. Before an end side 22 of the honeycomb structure 6 is brought into contact with the metallic melt 5, it is possible for a tubular casing 6' which may surround the honeycomb structure 6 to be joined to the honeycomb structure 6 by forming a thermal joint, for example through the use of an induction-brazing apparatus 13. By way of example, it is also possible for a device 8" for introducing the honeycomb structure 6 into a tubular casing 6' to be provided in the device 8 for forming a honeycomb structure 6.

A second handling device 12 is provided with the induction-brazing apparatus 13, which is used to form a brazed joint between the tubular casing 6' and the honeycomb structure 6. The first handling device 7 and the second handling device 12 interact in such a way that both induction brazing for joining the tubular casing 6' and the honeycomb structure 6 and bringing the tubular casing 6' and the honeycomb structure 6 into contact with the metallic melt 5, take place.

The induction-brazed joint may be formed before or after at least one of the end sides 22 of the honeycomb structure 6 has been brought into contact with the metallic melt 5. If the induction brazing is carried out before the honeycomb structure is brought into contact with the metallic melt 5, the honeycomb body or the honeycomb structure 6 and the tubular casing 6' are advantageously heated by the brazing process. It is also possible for the joint between the honeycomb structure 6 and the tubular casing 6' to be formed by other thermal joining processes, for example by welding or even by other brazing processes, in accordance with the invention.

Figure 2:
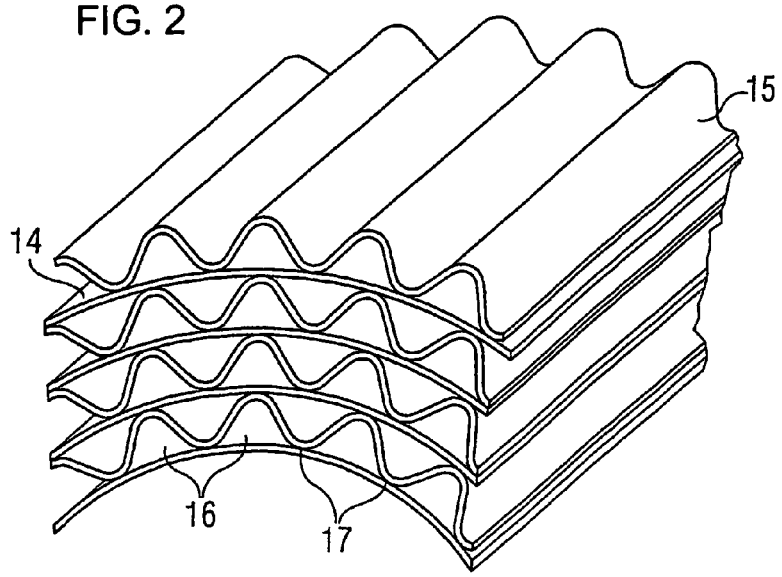
FIG. 2 is a perspective view of a portion of a honeycomb body according to the invention.

FIG. 2 shows a portion of a honeycomb body according to the invention. The honeycomb structure 6 of the honeycomb body is composed of substantially smooth sheet-metal layers 14 and structured sheet-metal layers 15, which form passages or cavities 16. Depending on the structure of the sheet-metal layers 14, 15, it is also possible, by way of example, to form honeycomb structures 6 which do not form continuous passages 16, but rather form other types of cavities. For example, it is possible in this way to produce a honeycomb body with passages which are each partially closed.

Layers of material which at least partially allow a fluid to flow through them, i.e. layers of a porous or even highly porous material, can be used according to the invention both as the smooth sheet-metal layers 14 and as the structured sheet-metal layers 15. According to the invention, it is also possible to use sheet-metal layers 14, 15 made from steel, for example.

The smooth sheet-metal layers 14 and the structured sheet-metal layers 15 have joining regions 17, in which the sheet-metal layers 14, 15 are joined to one another. According to the invention, the joint in the joining regions 17 shown by way of example is formed by the formation of an aluminum alloy with a locally lowered melting point, since the aluminum diffuses out of the metallic melt 5 into the sheet-metal layers 14, 15, where as a result it locally lowers the melting point, so that the sheet-metal layers 14, 15 are joined to one another by fusion in the joining regions 17. The local aluminum content is reduced further due to the diffusion operation proceeding further, so that the local melting point rises, resulting in renewed solidification, so that the joining regions 17 solidify again.

In principle, it should also be noted in this context that the process described can also be used in particular to locally reinforce or thicken the sheet-metal layers 14, 15. In other words, this means that the metallic melt which is applied, in particular an aluminum melt, is provided in quantities which are such that a type of coating is formed at least in a subregion of the sheet-metal layers 14, 15. It is preferably to be applied to both sides of the sheet-metal layers 14, 15. The thickening is advantageously in the range of greater than 10% of the sheet-metal layer thickness, in particular greater than 25% or even greater than 50%, and if appropriate in subregions which are encompassed by the above values. For example, layer thicknesses of the metallic melt in the solidified state which are, for example, greater than 2 μm, in particular greater than 20 μm, are generated on the surface of the sheet-metal layers 14, 15. These particularly reinforced, thickened sheet-metal layers or subregions of the sheet-metal layers 14, 15 permit positioning aids, spacers, stop surfaces or the like to be formed, allowing the honeycomb structure 6 to be configured as required. Furthermore, the thermal properties of the honeycomb body can be influenced in this way, since the subregions of the honeycomb structure 6 which are constructed to be thicker have a higher surface-area-specific heat capacity. In particular, this allows the thermal expansion properties of the honeycomb structure and, for example, also the properties of a catalytically active material applied to the surface, to be set as required.

Setting and controlling the temperature of the honeycomb structure 6 and of the metallic melt 5 advantageously allow the procedure to be controlled. In particular, the depth of penetration of the metallic melt 5 into the honeycomb structure 6, i.e. the height to which the metallic melt rises, and the diffusion length achieved by the aluminum in the sheet-metal layers 14, 15, can be controlled by stipulating the temperature of the honeycomb structure 6 and/or of the metallic melt 5. However, this has a crucial influence on the properties of the joint between the sheet-metal layers 14, 15.

Figure 3:
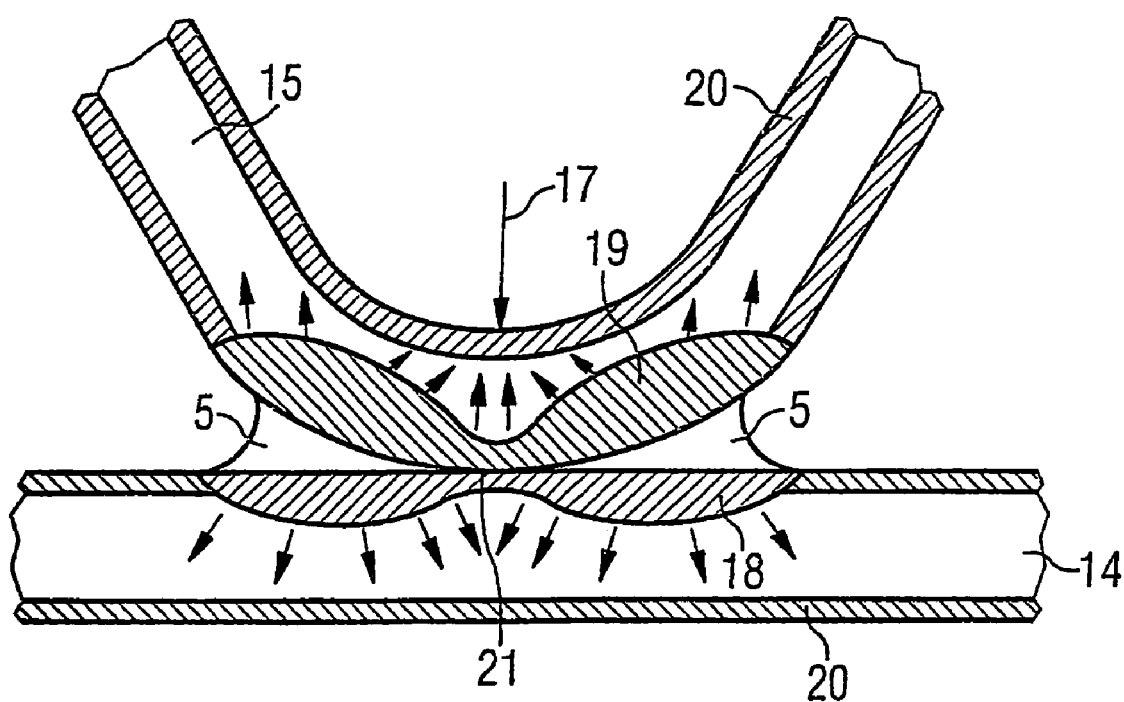
FIG. 3 is an enlarged, fragmentary, sectional view of a joining region of a honeycomb body according to the invention.

FIG. 3 uses the example of a honeycomb body according to the invention formed from steel sheets and substantially constructed from smooth sheet-metal layers 14 and structured sheet-metal layers 15 to diagrammatically depict a joining region 17 in detail. When the surface of the sheet-metal layers is wetted with the metallic melt 5, which in this example at least contains aluminum, the aluminum immediately begins to diffuse into the steel of the sheet-metal layers 14, 15, so that a first zone 18, a second zone 19 and a third zone 20 with a high aluminum content are formed in the sheet-metal layers 14, 15. These locally aluminum-rich alumina-steel alloys have a significantly lower melting point than the steel from which the sheet-metal layers 14, 15 are produced, so that the zones 18, 19 are temporarily liquefied. In this way, a very intimate joint is formed in the vicinity of a contact location 21, ideally virtually having the properties of a welded joint, since the steel sheets are in direct contact with one another before being joined. The aluminum continues to diffuse into the steel at high temperatures, as indicated by arrows, with the result that the melting point of the zones 18, 19 rises again and the joining region 17 solidifies. The joint created in this way is extremely stable, and the joining method additionally has the advantage that the steel can be enriched with aluminum, which is advantageous with regard to its corrosion properties. In the region of the third zone 20, the aluminum content is merely increased, thereby leading to improved corrosion properties in this third zone 20.

These improved corrosion properties are advantageous in particular in the end-side regions of the honeycomb body, since the exhaust gas generally flows into and leaves the honeycomb body through these regions. Consequently, these regions are exposed to particularly high mechanical and thermal loads.

In addition to the formation of aluminum-containing metallic melts, it is also conceivable to form metallic melts which, when they come into contact with the steel sheets, make use of a similar effect, which leads to intimate joining of the steel sheets. In this case, the melting point of an alloy of the material which forms the sheet-metal layers 14, 15 and a metal from the metallic melt 5 must be lower than the melting point of the material from which the sheet-metal layers 14, 15 to be joined are constructed. The lower melting point of the metallic melt 5 compared to the melting point of the sheet-metal layers 14, 15 is crucial to the invention.

The process and apparatus for producing a honeycomb body, according to the invention, advantageously allow an intimate and permanent joint to be produced between sheet-metal layers 14, 15 in joining regions 17 by bringing at least one end side of a honeycomb structure 6 of the honeycomb body into contact with a metallic melt 5 having a lower melting point than that of the honeycomb structure 6 and, for example, containing aluminum.

We claim:

1. A process for producing a honeycomb body, which comprises the following steps:
    a) forming a metallic honeycomb structure having cavities through which a fluid can at least partially flow by winding at least one sheet-metal layer including at least one at least partially structured sheet-metal layer;

b) bringing at least one end side of the honeycomb structure into contact with a liquid metallic melt in a reservoir, the liquid metallic melt being substantially formed of aluminum and having a lower melting point than the metallic honeycomb structure; and c) locally reinforcing the sheet-metal layers by forming a coating of metal from the metallic melt on the sheet-metal layers.

2. The process according to claim 1, which further comprises carrying out the step of forming the honeycomb structure by stacking a plurality of sheet-metal layers, some being structured and some being substantially smooth, into at least one stack, and intertwining the at least one stack.

3. The process according to claim 1, wherein at least some of the sheet-metal layers are at least partially formed of material through which a fluid can at least partially flow.

4. The process according to claim 2, wherein at least some of the sheet-metal layers are at least partially formed of material through which a fluid can at least partially flow.

5. The process according to claim 1, which further comprises introducing the honeycomb structure into a tubular casing before or after step b).

6. The process according to claim 5, which further comprises forming a thermal joint after process step b) to connect the honeycomb structure and the tubular casing.

7. The process according to claim 6, which further comprises carrying out the step of forming the thermal joint by a method selected from the group consisting of brazing, welding and induction-brazing.

8. The process according to claim 3, which further comprises forming a thermal joint before process step b) to connect the honeycomb structure and the tubular casing.

9. The process according to claim 8, which further comprises carrying out the step of forming the thermal joint just before process step b).

10. The process according to claim 8, which further comprises carrying out the step of forming the thermal joint by a method selected from the group consisting of brazing, welding and induction-brazing.

11. The process according to claim 5, which further comprises heating at least one of the honeycomb structure or the tubular casing to a predetermined temperature substantially corresponding to a temperature of the metallic melt, prior to step b).

12. The process according to claim 5, which further comprises heating at least one of the honeycomb structure or the tubular casing to a predetermined temperature above a temperature of the metallic melt, prior to step b).

13. The process according to claim 5, which further comprises heating at least one the honeycomb structure or the tubular casing to a predetermined temperature below a temperature of the metallic melt, prior to step b).

14. The process according to claim 1, which further comprises adding a liquid additive to the metallic melt at a predetermined temperature substantially corresponding to a melting point of the metallic melt.

15. The process according to claim 1, which further comprises carrying out at least the step of bringing the honeycomb structure into contact with the metallic melt under an atmosphere selected from the group consisting of a vacuum and a shielding gas.

16. The process according to claim 5, which further comprises carrying out at least one of bringing the honeycomb structure into contact with and introducing the tubular casing into the metallic melt under an atmosphere selected from the group consisting of a vacuum and a shielding gas.

17. The process according to claim 1, wherein the metallic melt is an aluminum-based alloy.

* * * * *